US010492050B2

(12) United States Patent
Knaappila

(10) Patent No.: US 10,492,050 B2
(45) Date of Patent: Nov. 26, 2019

(54) MULTIPLE LINK LAYERS AND ADVERTISEMENT POLICIES FOR WIRELESS COMMUNICATION

(71) Applicant: Silicon Laboratories Finland Oy, Espoo (FI)

(72) Inventor: Jere M. Knaappila, Evitskog (FI)

(73) Assignee: Silicon Laboratories Finland OY, Espoo (FI)

( * ) Notice: Subject to any disclaimer, the term of this patent is extended or adjusted under 35 U.S.C. 154(b) by 75 days.

(21) Appl. No.: 15/234,332

(22) Filed: Aug. 11, 2016

(65) Prior Publication Data

US 2018/0049106 A1    Feb. 15, 2018

(51) Int. Cl.
*H04W 4/80*     (2018.01)
*H04W 76/14*    (2018.01)
*H04W 8/00*     (2009.01)
*H04W 48/16*    (2009.01)

(52) U.S. Cl.
CPC ............. *H04W 4/80* (2018.02); *H04W 8/005* (2013.01); *H04W 48/16* (2013.01); *H04W 76/14* (2018.02)

(58) Field of Classification Search
CPC ... H04W 48/10; H04W 4/008; H04W 52/322; H04W 76/023; H04W 4/80; H04W 76/14; H04W 8/005; H04W 48/16
See application file for complete search history.

(56) References Cited

U.S. PATENT DOCUMENTS

| | | |
|---|---|---|
| 2014/0321321 A1 | 10/2014 | Knaappila |
| 2015/0271628 A1 | 9/2015 | Knaappila |
| 2015/0289207 A1* | 10/2015 | Kubo ................ H04W 52/0219 370/311 |
| 2015/0319600 A1 | 11/2015 | Knaappila |
| 2016/0189214 A1* | 6/2016 | Dai .................... G06Q 30/0255 705/14.53 |
| 2016/0212147 A1* | 7/2016 | Palin ..................... H04L 63/062 |
| 2017/0374629 A1* | 12/2017 | Ramappa ............... H04W 4/80 |

FOREIGN PATENT DOCUMENTS

WO    WO2013/126747 A2    8/2013

OTHER PUBLICATIONS

Wikipedia, iBeacon, Printed from Internet May 22, 2016, 8 pgs.
Bluetooth SIG, "LE Advertising Extensions", Bluetooth Specification Change Request, May 31, 2016, 184 pgs.

* cited by examiner

*Primary Examiner* — Jianye Wu
(74) *Attorney, Agent, or Firm* — Egan Peterman Enders Huston

(57) ABSTRACT

Systems and methods that may be implemented to configure a single common radio frequency (RF) radio module with multiple link layers to allow the radio module to transmit different advertisement packets at the same time using different advertisement configuration parameters. A radio module may be simultaneously configured with the multiple link layers to allow the radio module to operate using unique different advertisement parameters corresponding to each of multiple different advertisement policies, and such that the radio module may selectively transmit advertisement packets in real time using any one of the different advertisement policies.

27 Claims, 6 Drawing Sheets

MULTIPLE LINK LAYERS AND ADVERTISEMENT POLICIES FOR WIRELESS COMMUNICATION

FIELD

The disclosed systems and methods relate to wireless communication and, more particularly, to advertisement policies for wireless communication.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited only those, but increasingly more new application utilizing BLE technology are designed.

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

In BLE technology, one or more so called slave devices can be connected to a master device. To let the master know about the slave devices before connection, the slave devices (or at that point "advertisers") periodically, at pseudo-random intervals, pass advertisement packets which the master device (also known as scanner device, i.e. "scanner") is scanning. Depending on the type of advertisement packet sent by a slave device, the master device may respond to the received advertisement packet by requesting a connection with the slave device, or may respond by requesting further information from the advertising device. Beacons are a particular type of BLE advertiser device that transmit advertisement packets with a unique identifier to nearby portable electronic devices such as smart phones. An application on a portable electronic device may respond to information within an advertisement packet received from a beacon by performing an action, such as approximating the location of the portable device.

FIG. 1 illustrates a conventional link layer 150 configured for operation between a host interface 170 and a radio interface 180 of a BLE module. As shown, link layer 150 includes a scanner/initiator state 160 for scanning and initiating connections, an advertiser state 162 for advertising, and multiple connections $152_1$-$152_3$. In the operation of conventional link layer 150, non-connected tasks such as advertising can operate in only one state at a time, and can only have one set of advertisement parameters including, for example, advertisement interval, advertisement data, transmit (TX)-power, and device address. Thus, such a conventional BLE module device can only operate in only one mode at time, and if the device is in a non-connectable beacon state it cannot receive connections. When operating as a master device, a BLE module 100 may be simultaneously connected to multiple slave devices by respective multiple connections $152_1$-$152_3$.

SUMMARY

Disclosed herein are systems and methods that may be implemented to configure a single common radio frequency (RF) radio module (e.g., such as a BLE module) with multiple link layers to allow the radio module to transmit different advertisement packets at the same time using different advertisement configuration parameters, e.g., without changing advertisement parameters at the application level and/or without reconfiguring the radio module between transmission of the different advertisement packets. Using the disclosed systems and methods, a radio module may be enabled with multiple advertisement policy capability by configuring the radio module with multiple link layers so as to allow the radio module to simultaneously operate using unique different advertisement parameters (e.g., packet type or advertisement mode, advertisement interval, advertisement data, transmit power and sensitivity levels, device address, device identity, etc.) corresponding to each of the multiple different advertisement policies, and such that the radio module may selectively transmit advertisement packets in real time using any one of the different advertisement policies, e.g., based on application layer and/or host layer enable commands. For example, in one embodiment each of the multiple advertisement policies may specify a different advertisement mode (e.g., such as either a connectable advertisement mode or non-connectable advertisement mode) for each given advertisement packet, and optionally in combination with a different radio frequency transmission power for the given advertisement packet. This is in contrast to conventional radio modules that are only capable of being configured at any given time to transmit packets using a single advertisement mode and power.

In one exemplary embodiment, the disclosed systems and methods may be implemented to allow a beacon-type device to use a single radio module to transmit relatively long range non-connectable advertisement packets data, while at the same time allowing relatively short range connections to be made to the beacon-type device through the same radio module, e.g., for configuration or other purposes. For example, in the case of BLE wireless technology, a BLE radio module may be provided with multiple link layers simultaneously implementing different respective advertisement policies such that each link layer is configured to transmit different types of advertisement packets and/or using a different transmit power or sensitivity. As so configured, a BLE radio module may selectively transition between transmitting the different types of advertisement packets (optionally using different respective power levels) without requiring reconfiguration of any link layer advertisement policy settings in the radio module. In this regard, such a BLE radio module may first transmit relatively long range non-connectable advertisement packet's that contain beacon information at a relatively high power, and then may transmit relatively short range connectable advertisement packets at a relatively low-power. In one embodiment, a BLE radio module may selectively transition back and forth between transmitting the different types of advertisement packets without causing any disruption to scheduled or otherwise required timings for transmitting advertisement packets, and without causing any noticeable gaps or timing errors in advertisement packet transmission.

In one respect, disclosed herein is a method including using multiple separate link layers of an apparatus to cause transmission of multiple different respective advertisement packets from the apparatus according to multiple different respective advertisement policies, where each of the different advertisement policies includes one or more advertisement configuration parameters that are different from one or more advertisement configuration parameters of the other different advertisement policies.

In another respect, disclosed herein is an apparatus including at least one processor or programmable logic device (PLD) coupled to memory and configured to be coupled to an antenna, the processor or PLD being programmed to implement multiple separate link layers of the radio apparatus to cause transmission of multiple different respective advertisement packets from the radio apparatus according to multiple different respective advertisement policies. Each of the different advertisement policies may include one or more advertisement configuration parameters that are different from one or more advertisement configuration parameters of the other different advertisement policies.

DESCRIPTION OF ILLUSTRATIVE EMBODIMENTS

Figure 1:
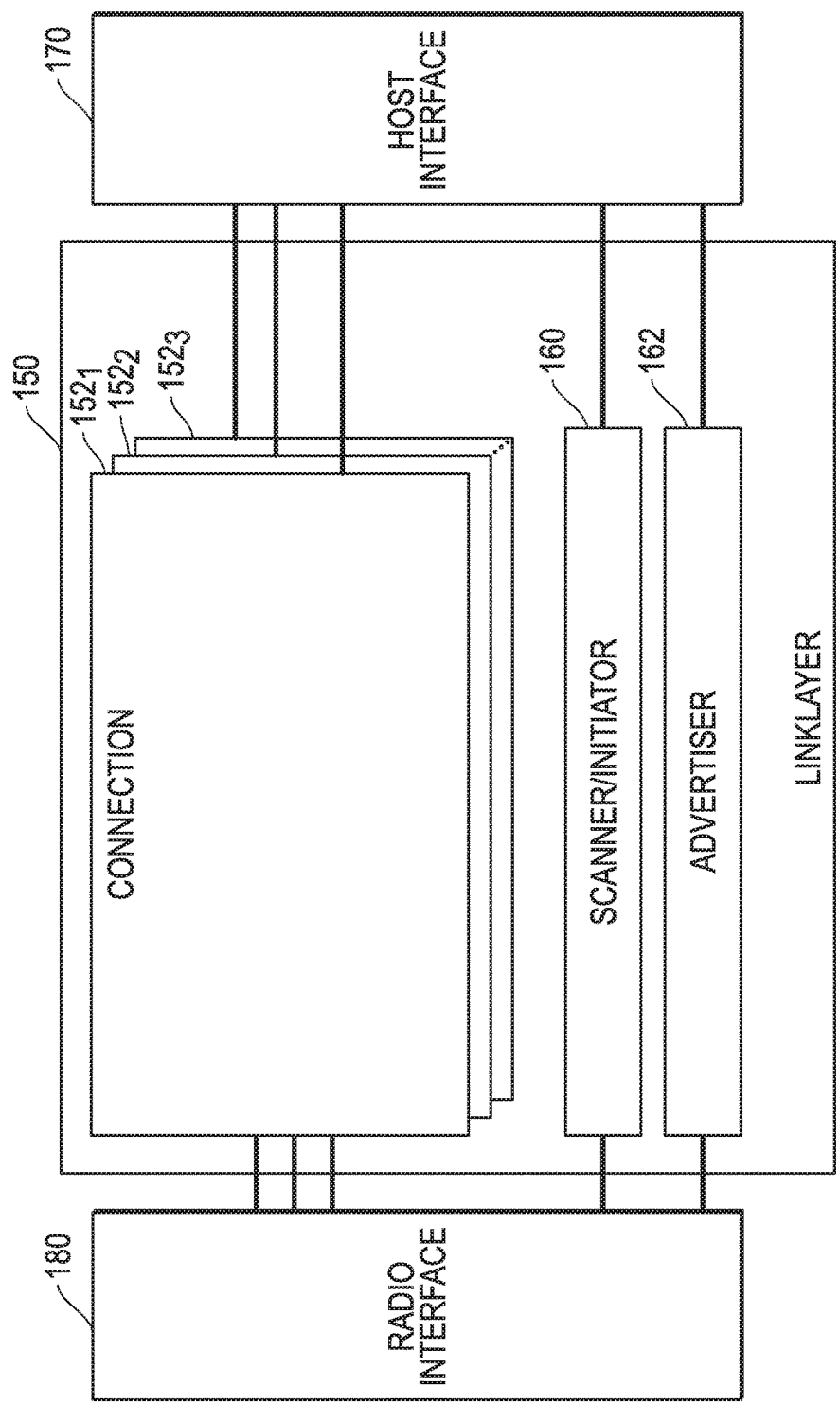
FIG. 1 illustrates a conventional link layer between a host interface and a radio interface.
Figure 2:
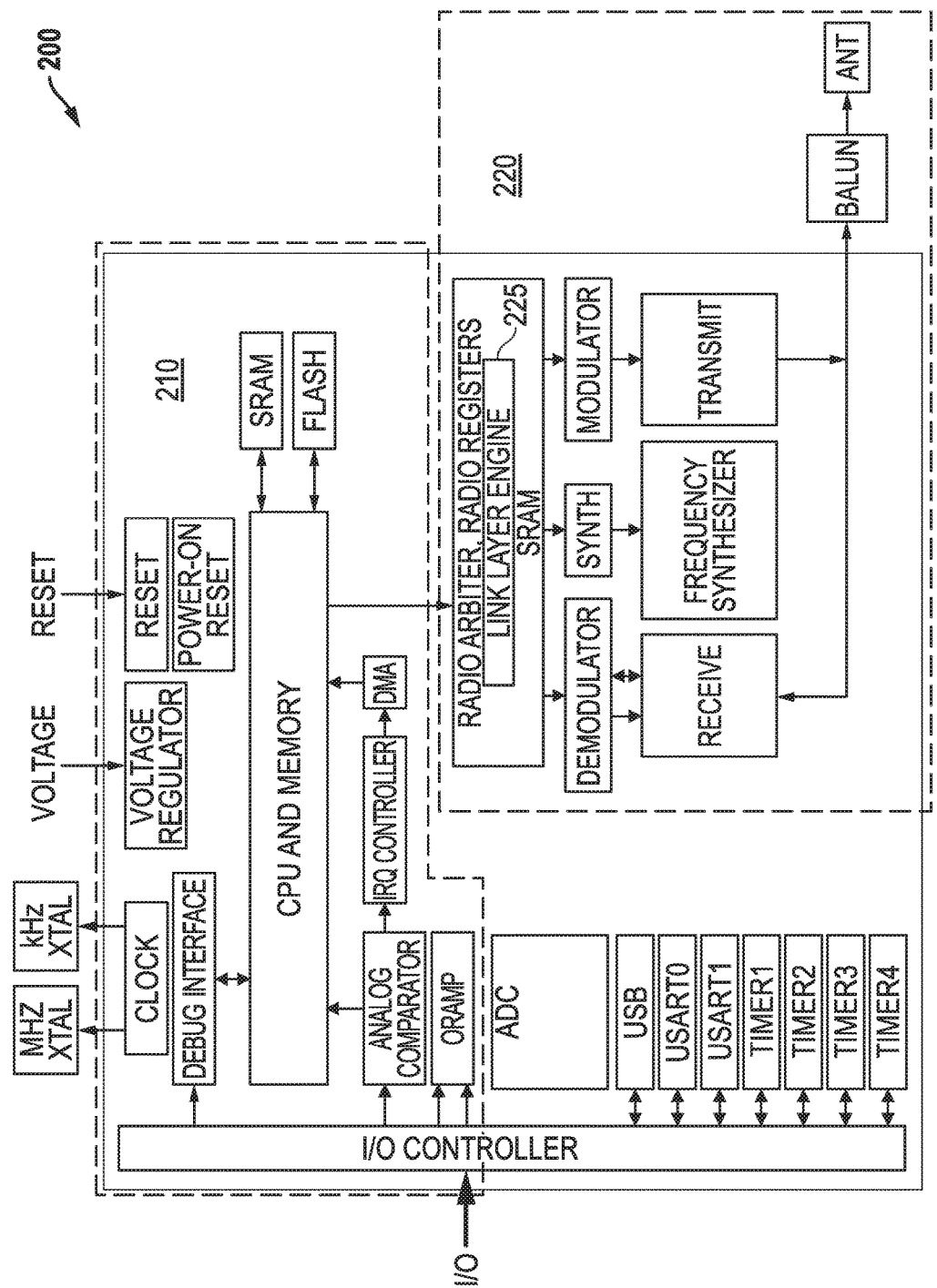
FIG. 2 illustrates a simplified block diagram of a Bluetooth module according to one exemplary embodiment of the disclosed systems and methods.

FIG. 2 illustrates a simplified block diagram of an example BLE module 200 that may be employed in one exemplary embodiment as a BLE device to implement the disclosed systems and methods. As shown, BLE module 200 includes a first module segment 210 that includes one or more central processing units (CPUs), processors or other processing devices and memory with application data. A second module segment 220 is configured to implement a part of a link layer and physical layer for radio module 200, and includes components such as radio registers, link layer engine 225, modulator-demodulator, receiver and transmitter, frequency synthesizer, balancing-unbalancing unit ("balun"), antenna ("ant"). In one embodiment, second module segment 220 may include memory and one or more microcontrollers, processors or other processing devices programmed or otherwise configured to execute one or more components of module segment 220, e.g., such as link layer engine 225. In one embodiment the one or more processing devices, memory, and clock circuitry of module segment 210 may be coupled to each other and to components of module segment 220 through a system bus interconnect or one or more other types of suitable communication media, including one or more electrical buses and/or intervening circuitry that provides electrical communications. In certain embodiments, memory of module segments 210 and 220 may contain instructions which, when executed by processing devices of BLE module 200, enable the BLE module 200 to operate as a BLE device to perform the functions described herein. Memory of BLE module 200 may be implemented, for example, using one or more non-volatile memories (e.g., FLASH read-only-memories (ROMs), electrically programmable ROM (EPROMs), and/or other non-volatile memory devices) and/or one or more volatile memories (e.g., dynamic random access memories (DRAMs), static random access memories (SRAM) and/or other volatile memory devices).

Second module segment 220 includes circuitry that operates as a wireless interface for first module segment 210 and that is coupled to an antenna as shown. Second module segment 220 may include a radio that includes baseband processing, MAC (media access control) level processing, and/or other physical layer processing for BLE packet communications. The processing devices of first module segment 210 and second module segment 220 may also read and write from the various system memory during operations, for example, to store packet information being received from or transmitted to another BLE device. Although not shown, BLE module 220 may also be coupled receive power from a power supply, which may be a battery or a connection to a permanent power source such as a wall outlet.

Figure 3:
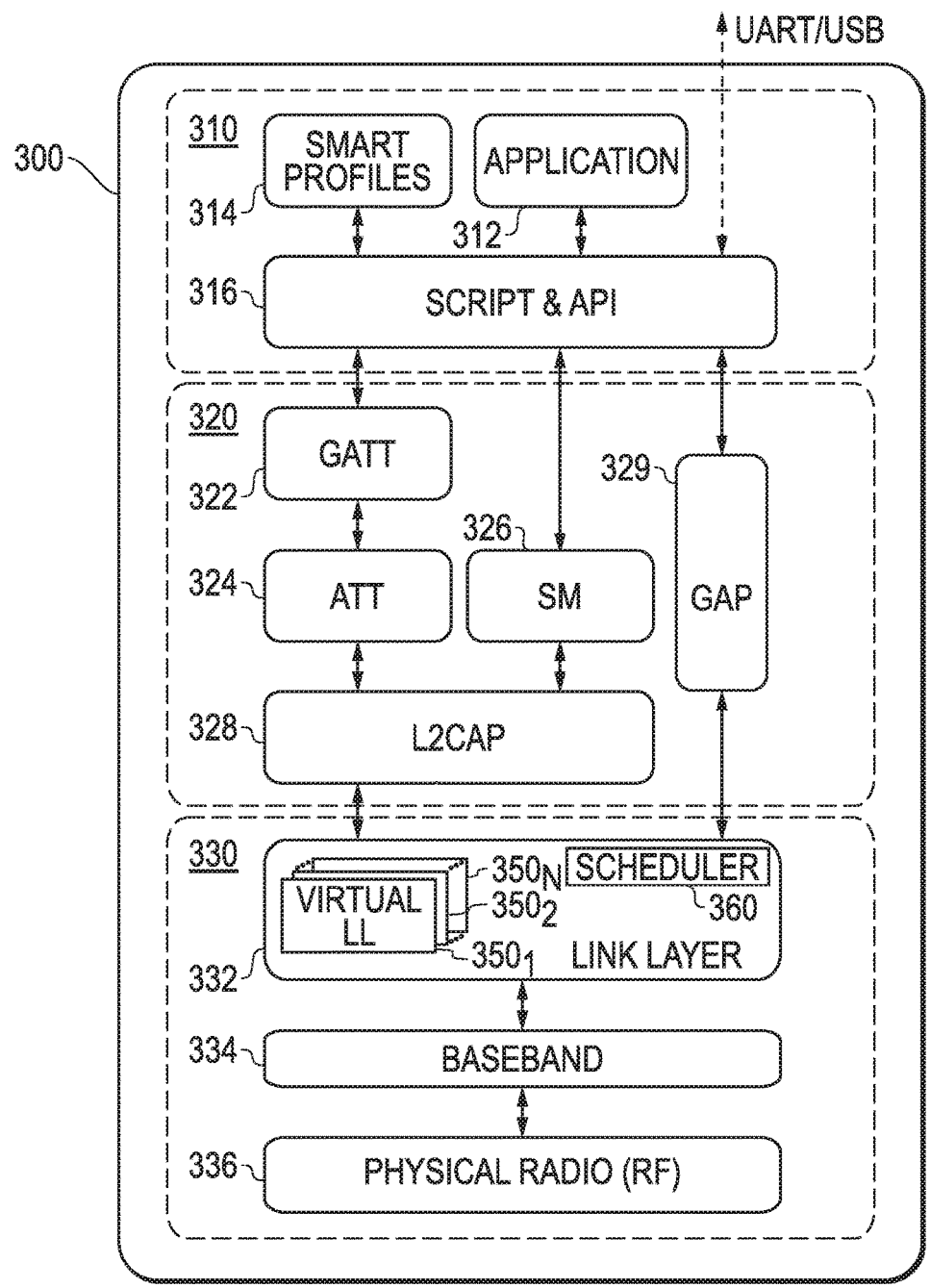
FIG. 3 is a simplified illustration of components of a Bluetooth smart module according to one exemplary embodiment of the disclosed systems and methods.

FIG. 3 is a simplified illustration of application, host and BLE control components of a Bluetooth smart module 300 configured according to one exemplary embodiment of the disclosed systems and methods. Although a Bluetooth smart module is illustrated, it will be understood that the disclosed systems and methods may be implemented with any other RF communication technology that employs advertisement packets. Components of Bluetooth smart module 300 may be implemented, for example, using the hardware components of radio module 100 or any other suitable combination of radio hardware components. As shown, in this embodiment Bluetooth smart module 300 includes application layer 310, host layer 320 and a Bluetooth (or BLE) controller 330. Application layer 310 may include, for example, apparatus-related application/s 312 (e.g., heart rate, proximity, blood pressure, time update, temperature, battery, etc.), smart profiles 314, and script and application programming interface (API) 316. Application layer 310 is capable of reading sensor data (e.g., from heart rate sensor, etc.), and reporting the data to host layer 320 for transmission using Bluetooth (or BLE) controller 330. Host layer 320 includes protocols running over the connection. Host layer 320 also includes data to be used in advertisement profile (GATT) 322, generic access profile (GAP) 329, attribute protocol (ATT) 324, security manager (SM) 326 and logical link control and adaptation protocol (L2CAP) 328. As shown in FIG. 3, Bluetooth (or BLE) controller 330 also includes link layer 332, baseband 334, and physical layer 336 (i.e., physical radio, radio frequency RF).

Still referring to FIG. 3, link layer 332 is present to provide ultra-low power idle mode operation and device discovery (i.e., connection mode and advertising mode handling). Link layer 332 is also configured to control packet transmission and response. In the illustrated embodiment, link layer 332 is itself configured with multiple virtual link layers $350_1$-$350_N$ that are simultaneously operating, and a scheduler 360 that is configured to control access of the virtual link layers 350 to common radio resources of physical layer 336 through baseband 334 in a manner described further herein.

In BLE technology, one or more so called slave devices may be connected to a master device. The master may be configured to communicate with one or more slave devices—also simultaneously. To let the master know about the slave devices, the slave devices (or at that point "advertisers") may periodically, at pseudo-random intervals, pass advertisement packets which a master device (also known as scanner device, i.e. "scanner") is scanning.

Example advertisement packet types that may be transmitted from a slave device include:

ADV_IND connectable and scannable undirected advertising event

ADV_DIRECT_IND connectable directed advertising event ADV_NONCONN_IND non-connectable or non-scannable undirected advertising event ADV_SCAN_IND scannable undirected (non-connectable) advertising event.

Example types of response packets that may be transmitted by a scanning device in response to received advertisement packets of the advertising device include:

SCAN_REQ scan request for further information from advertiser

CONNECT_REQ connect request.

If the advertiser sends either the ADV_IND or ADV_DIRECT_IND packets, a scanner desiring to exchange data with the advertiser may send a CONNECT_REQ packet. If the advertiser accepts the CONNECT_REQ packet, the devices become connected and the communication may be started. At this point, the advertiser becomes a slave and the scanner becomes a master. After connected, the master device may request bonding with the slave device. This means that the devices exchange keys or other encryption info to be stored for future connections.

Instead of the CONNECT_REQ, the scanner device may also respond with SCAN_REQ, which is a request for further information from the advertiser. This may be sent as a response to ADV_IND or ADV_SCAN_IND advertising packets.

When an advertising receives a SCAN_REQ packet from a scanning device, the advertising device may give more information to the scanning device by transmitting a scan response (SCAN_RSP) packet. A SCAN_RSP packet may contain information on the name of the advertising device and on the services the advertising device is able to provide. However, SCAN_RSP packet is not limited to carry only this information but may contain other data as well or instead.

As said, a scanning device wishing to connect with the advertising device may send a CONNECT_REQ packet that contains data on one or more of the following: transmit window size defining timing window for first data packet, transmit window offset that is off when the transmit window starts, connection interval which is the time between connection events, slave latency defines number of times the slave may ignore connection events from the master, connection timeout is maximum time between two correctly received packets in the connection before link is considered to be lost, hop sequence is a random number appointing the starting point for a hop, channel map, CRC (Cyclic Redundancy Check) initialization value. The CONNECT_REQ packet initiates the connection, i.e., creates a point-to-point connection between the devices.

The state for passing advertising packets is called "advertising state" and the state for connection is called "connected state". In both states, data transfer occurs. A slave device may be a sensor or an actuator, such as a temperature sensor, heart rate sensor, light bulb, proximity sensor, etc. A master device may be any electronic device capable of collecting data, e.g., mobile phone, smart phone, personal digital assistant, personal computer, laptop computer, tablet computer, etc.

Packets sent from a slave device in advertising mode may contain approximately 28 bytes of data and a slave address. Packets from a master device in advertisement channel may contain scanner and advertiser addresses. According to an embodiment, the packets from a master device in advertisement channel contains only a master address. Further information on BLE operations and communications may be found, for example, in United States Patent Application Publication No. 2014/0321321; United States Patent Application Publication No. 2015/0319600; and United States Patent Application Publication No. 20150271628, each of which is incorporated herein by reference in its entirety for all purposes.

Figure 4:
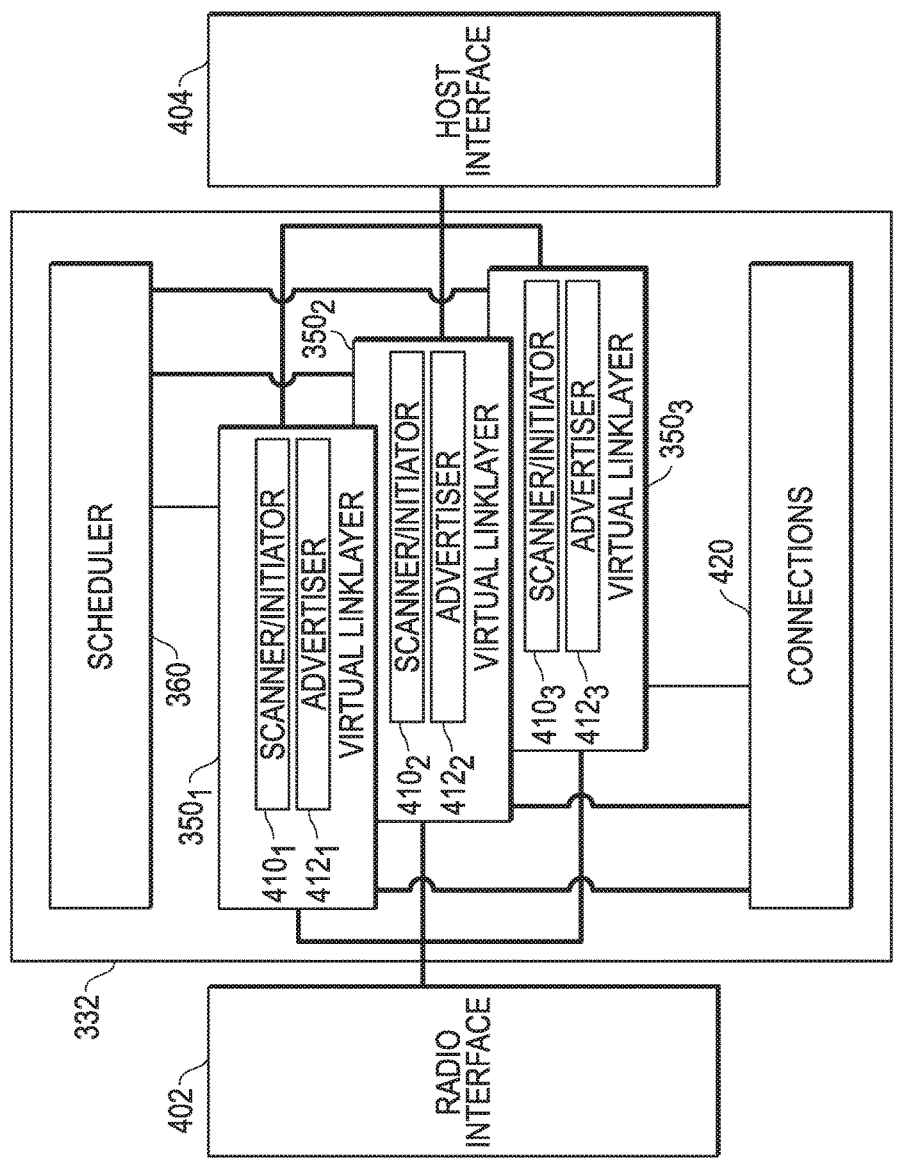
FIG. 4 illustrates a link layer implemented according to one exemplary embodiment of the disclosed systems and methods.

FIG. 4 illustrates link layer 332 as it may be implemented according to one exemplary embodiment of the disclosed systems and methods between a radio interface 402 and host interface 404 of BLE module 200 FIG. 2, e.g., by firmware and/or software of link layer engine 225. As previously described, link layer 332 is configured to simultaneously implement and operate multiple independent virtual link layers $350_1$ to $350_N$ that each has its own set of different advertisement parameters (e.g., packet type or advertisement mode, advertisement interval, advertisement data, transmit power and sensitivity levels, device address, device identity, etc.). In this embodiment, each virtual link layer 350 is not aware of the presence or operation of the other simultaneously operating virtual link layers 350, and therefore each virtual link layer 350 operates independently of all other virtual link layers 350. Further each of virtual link layers 350 may be configured to independently respond to specific advertising, scan and connection enable commands individually addressed to each of virtual link layers 350 and received through host interface 404 from application layer 310 and/or host layer 320.

As further shown in FIG. 4, the multiple virtual link layers $350_1$ to $350_N$ share the same radio interface 402 and radio 336. In one embodiment, only one virtual link layer 350 of link layer 332 may access the radio 336 at any given time, and link layer 332 includes a scheduler 360 which is configured to arbitrate or otherwise coordinate access by the virtual link layers $350_1$ to $350_N$ to radio interface 402 and common radio resources of BLE controller 330, i.e., such that each of multiple virtual link layers 350 is given access to the radio resources through radio interface 402, but such that only one virtual link layer 350 is given access to radio interface 402 and the radio resources at any given time. In one exemplary embodiment, scheduler 360 may be configured to coordinate access by the virtual link layers $350_1$ to $350_N$ to radio interface 402 using first-in first out (FIFO), round robin scheduling, or by using any other suitable alternative arbitration scheme. This allows each of the multiple virtual link layers $350_1$ to $350_N$ to implement its own unique advertisement policy such that the BLE module 300 may transmit advertisement packets using different advertisement policies. In this way, multiple advertisement policies may be implemented by the same device.

Still referring to FIG. 4, each of virtual link layers $350_1$ to $350_N$ is configured to implement its own respective advertiser 412, e.g., so as to allow each different virtual link layer 350 to implement a unique combination of advertisement parameters for an advertisement policy that is different from a combination of advertisement parameters corresponding to advertisement policies implemented by the other virtual link layers 350. This capability allows a single or common BLE module 300 to be simultaneously configured to implement multiple different advertisement policies from the same device. In this regard, the advertisement policy implemented by the advertiser 412 of each of respective virtual link layers $350_1$ to $350_N$ may be stored in memory and may be different from the advertisement policy implemented by the advertisers 412 of the other remaining virtual link layers 350, and each different advertisement policy may specify one or more different advertisement parameters such as different advertisement mode (e.g., a connectable advertisement mode, a non-connectable advertisement mode), a different advertisement interval, different advertisement data, different device address, different device identity, different advertisement packet transmission power, different receive sensitivity, any combination thereof, etc.

Scanner/initiator 410 of each of virtual link layers $350_1$ to $350_N$ of FIG. 4 may be present to allow each virtual link layer 350 to send scan requests and responses, and to initiate connections 420 in response to receipt of connectable directed advertisement packets, e.g., while at the same time other virtual link layers 350 are operating in beacon advertising mode to transmit non-connectable advertisement packets and/or are operating to transmit other types of connectable advertisement packets. In this embodiment, connection tasks are fully independent of the operation of the rest of the link layer 332, and therefore multiple connections 420 may be kept in a common connection pool as shown. Connections 420 may co-exist with transmission of advertisement packets by one or more of virtual link layers $350_1$ to $350_N$.

Figure 5:
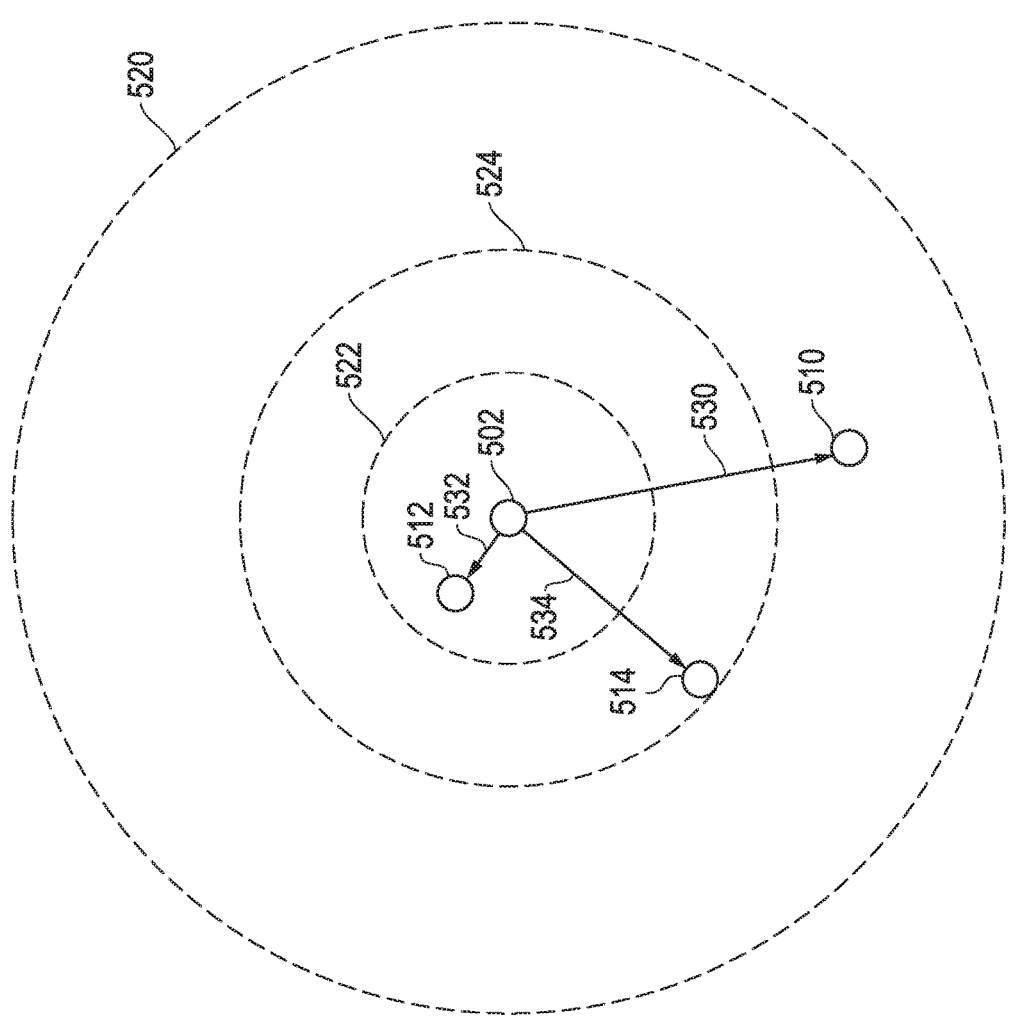
FIG. 5 illustrates an overhead view of transmission of packets from an advertising device to different scanning devices according to one exemplary embodiment of the disclosed systems and methods.

FIG. 5 illustrates one exemplary embodiment in which an advertising device 502 is transmitting advertisement packets to different scanning devices 510, 512 and 514 that are located at different distances from advertising device 502. As shown in FIG. 5, a non-connectable undirected advertisement packet 530 is being transmitted (e.g., as a beacon) at a relatively higher power and therefore over a relatively longer distance range 520 from advertising device 502 (e.g., a distance range of greater than or equal to about 300 meters) to a first scanning device 510 according to a first advertisement policy, and a connectable undirected advertisement packet 532 is being transmitted at a relatively lower power and therefore over a relatively shorter distance range 522 from the same advertising device 502 (e.g., a distance range of less than or equal to about 10 meters) to a second and closer scanning device 512 according to a second advertisement policy. In one embodiment, advertising device 502 may include BLE module 300, in which case non-connectable undirected advertisement packet 530 may be transmitted according to the first advertisement policy under the control of a respective advertiser $412_1$ of a first one of virtual link layers $350_1$, while connectable undirected advertisement packet 532 may be transmitted according to the second advertising policy under the control of a respective advertiser $412_2$ of a second and different one of virtual link layers $350_2$. In one exemplary embodiment, the same or similar embodiments may be implemented, for example, to allow a beacon type device to advertise data using very high transmission power to achieve relatively very high distance advertisement transmission range (e.g., greater than about 300 meters), while at the same time allowing connections to be received by the same device only from nearby devices. In this way, connections can only be made to the same beacon device for over-the-air configuration of the beacon device or for other purposes using connectable advertisement packets transmitted only a relatively close proximity distance range from the beacon device (e.g., transmitted less than about 10 meters) and optionally transmitted using an entirely different device address.

FIG. 5 also illustrates a connectable directed advertisement packet 534 being transmitted at a relatively intermediate power and over an intermediate distance range 524 (e.g., between about 10 meters and about 300 meters) under the control of a respective advertiser $4123$ of a third one of virtual link layers $350_3$ from the same advertising device 502 to a third advertising device 514 (located between scanning devices 510 and 512) according to a third advertisement policy.

In the above example, predefined advertising parameters for a first advertisement policy may be maintained by advertiser $412_1$ of virtual link layer $350_1$. In this case, the first advertisement policy may specify a beacon advertising mode and non-connectable advertisement packet type together with a RF transmit power parameter that is sufficient to transmit the non-connectable undirected advertisement packet 530 at a predefined transmit power level that is suitable for achieving a relatively longer transmit range 520 (e.g., greater than or equal to about 300 meters). Similarly, predefined advertising parameters for a second advertisement policy may be maintained by advertiser $412_2$ of virtual link layer $350_2$, and may specify a connectable advertising mode with connectable packet type and RF transmit power parameter that is sufficient to transmit a connectable directed or undirected advertisement packet 532 at a predefined transmit power level that is suitable for achieving a relatively shorter transmit range (e.g., less than or equal to about 10 meters). It will be understood that each of first and second advertisement policies may include additional or alternative advertisement parameters that are unique to each policy, e.g., such as different advertiser device address or identity for transmitted packets of each policy, different specified advertisement interval between advertisement packets of each policy, different advertisement data (e.g., such as data indicating capabilities and/or geographical location of the advertising device 502, etc.).

Figure 6:
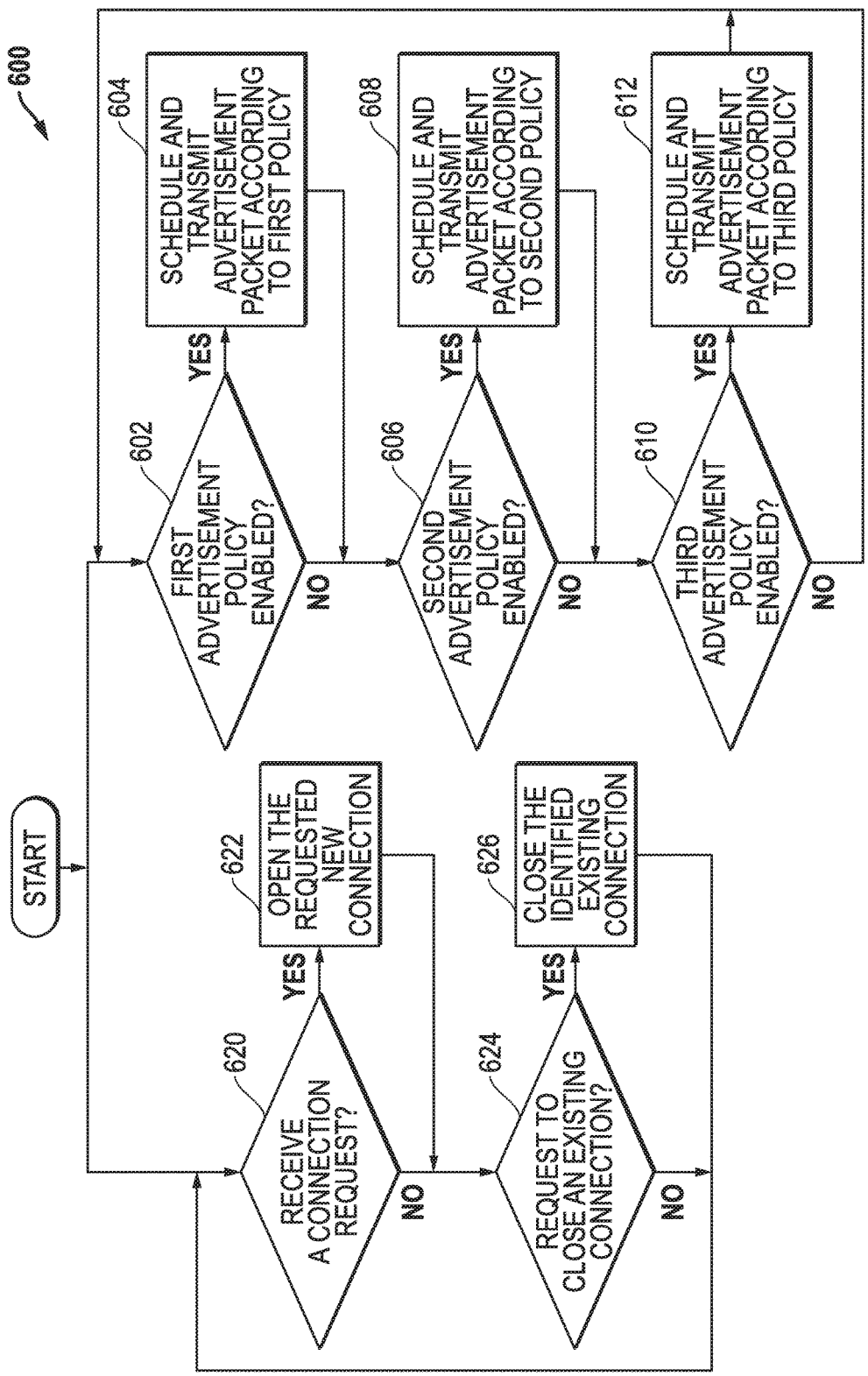
FIG. 6 illustrates methodology according to one exemplary embodiment of the disclosed systems and methods.

FIG. 6 illustrates one exemplary embodiment of methodology 600 having two possible simultaneously operating branches as it may be implemented for an advertising device 502 by a radio module such as a Bluetooth smart module 300 of FIG. 3. Using the embodiments of FIGS. 3-5 as an example only for reference, methodology 600 begins at a first branch in step 602 where scheduler 360 coordinates access to radio interface 402 by each of virtual link layers $350_1$, $350_2$, and $350_3$ which are operating simultaneously, but independently, from each other. In this embodiment, each of virtual link layers $350_1$, $350_2$, and $350_3$ has a respective advertiser $412_1$, $412_2$, or $412_3$ that is configured to independently implement a different advertisement policy to transmit advertising packets using a unique set of advertisement parameters that are different from the other respective advertisers 412 of the other virtual link layers 350. As an example, the embodiment of FIG. 6 will be described below assuming a first advertisement policy implemented for virtual link layer $350_1$ that specifies transmission of a non-connectable undirected advertisement packet 530 (e.g., as a beacon) at a relatively higher power, a second advertisement policy implemented for virtual link layer $350_2$ that specifies transmission of a connectable undirected advertisement packet 532 at a relatively lower power. and a third advertisement policy implemented for virtual link layer $350_3$ that specifies transmission of a connectable directed advertisement packet 534 at a relatively intermediate power, i.e., a transmission power that is less than the relatively higher transmission power of the first policy and that is greater than the relatively lower transmission power of the second policy. It will be understood that these are only exemplary advertisement policies given as way of example to explain the methodology 600 of FIG. 6, and that the disclosed systems and methods may be implemented using any other greater or lesser number of advertisement policies that are implemented using different advertisement parameters for respective virtual link layers of a radio module.

Still referring to FIG. 6, an advertising policy for each of virtual link layers $350_1$, $350_2$, and $350_3$ may be selectively enabled, e.g., by enable commands individually addressed to each of virtual link layers $350_1$, $350_2$, and $350_3$ and received through host interface 404 from application layer 310 and/or host layer 320. When its respective advertising policy has been enabled, a given one of virtual link layers 350 is ready to transmit advertising packet/s according to the unique set of advertisement parameters of its respective advertising policy as implemented by its respective advertiser 412. Thus, scheduler 360 determines in step 602 if the first advertisement policy of virtual link layer $350_1$ has been enabled by a first advertisement enable command through host interface 404 and, if so, in step 604 schedules transmission at a first time of a non-connectable undirected advertisement packet 530 at a relatively higher power according to the first advertisement policy. Whether or not the first advertisement policy of virtual link layer $350_1$ has been enabled, methodology 600 then moves to step 606 where scheduler 360 determines if the second advertisement policy of virtual link layer $350_2$ has been enabled by a second advertisement enable command through host interface 404 and, if so, schedules transmission at a second time (different than the first time) of a connectable undirected advertisement packet 532 in step 608 at a relatively lower power according to the second advertisement policy. Whether or not the second advertisement policy of virtual link layer $350_2$ has been enabled, methodology 600 then moves to step 610 where scheduler 360 determines if the third advertisement policy of virtual link layer $350_3$ has been enabled and, if so, schedules transmission at a third time (different than the first and second times) of a connectable directed advertisement packet 534 to a specified initiator device address in step 612 at a relatively intermediate power according to the third advertisement policy. As shown methodology 600 the repeats back to step 602 where scheduler once again coordinates access to radio interface 402 by each of virtual link layers $350_1$, $350_2$, and $350_3$ by repeating steps 602 to 612.

As shown further shown in FIG. 6, one or more independent connections 420 may be established and closed using respective virtual link layers $350_1$, $350_2$, and/or $350_3$ simultaneously with the performance of steps 602-612 of a second simultaneously-operating branch of methodology 600. Specifically, one or more of virtual link layers $350_1$, $350_2$, and/or $350_3$ may receive a connection request in step 620, e.g., from a BLE scanning device 512 or 514 in response to transmission of a connectable advertising packet 512 or 514 by BLE advertising device 502 to BLE scanning device 512/514, or in response to a scan response sent by one or more of virtual link layers $350_1$, $350_2$, and/or $350_3$ to BLE scanning device 512/514. A new connection is opened in step 622 in response to the connection request as shown. Then methodology 600 proceeds to step 624 where a request to close an existing connection 420 may be received across host interface 404 by link layer 332 from an application of application layer 310 and/or host layer 320. The specified connection 420 is then closed in step 626 by the appropriate virtual link layer 350, and this branch of methodology 600 returns to step 620.

It will be understood that methodology 600 of FIG. 6 is exemplary only, and that any other combination of additional, fewer, and/or alternative steps may be employed that is suitable for enabling a radio module to selectively transmit different advertisement packets according to different respective advertisement polices, and using unique advertisement parameters corresponding to each of the multiple different advertisement policies, without reconfiguring the radio module between transmission of the different advertisement packets.

It will also be understood that one or more of the tasks, functions, or methodologies described herein for a radio module or radio device (e.g., including those described herein for components of application layer 310, host layer 320 and BLE controller 330 of FIG. 3; module segment 210, module segment 220 including link layer engine 225 of FIG. 2, etc.) may be implemented using one or more electronic circuits (e.g., central processing units (CPUs), controllers, microcontrollers, microprocessors, hardware accelerators, FPGAs (field programmable gate arrays), ASICs (application specific integrated circuits), and/or other programmable processing circuitry) that are programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For example, one or more of the tasks, functions, or methodologies described herein may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processor such as CPU, controller, microcontroller, microprocessor, ASIC or executed on a programmable logic device "PLD" such as FPGA, complex programmable logic device "CPLD", etc.) to perform one or more steps of the methodologies disclosed herein. In one embodiment, a group of such processors and PLDs may be processing devices selected from the group consisting of CPU, controller, microcontroller, microprocessor, FPGA, CPLD and ASIC. The computer program of instructions may include an ordered listing of executable instructions for implementing logical functions in the radio module. The executable instructions may include a plurality of code segments operable to instruct components of the radio module to perform the methodology disclosed herein. It will also be understood that one or more steps of the present methodologies may be employed in one or more code segments of the computer program. For example, a code segment executed by the information handling system may include one or more steps of the disclosed methodologies.

Further, while the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed circuits and methods may be utilized in various combinations and/or independently. Thus the invention is not limited to only those combinations shown herein, but rather may include other combinations.

What is claimed is:

1. A method, comprising:

simultaneously operating multiple separate Bluetooth Low Energy (BLE) link layers implemented by a common BLE controller of a BLE enabled apparatus to share a same radio interface of a same radio; and arbitrating access by each of the separate link layers one at a time to the same radio interface while the multiple different separate link layers are simultaneously operating to allow each of the separate link layers to access the same radio interface separately from each of the other link layers and implement its own unique advertisement policy that is different from the respective advertisement policy of each of the other link layers to cause the apparatus to transmit multiple different respective BLE advertisement packets using different advertisement policies while the different separate link layers continue to simultaneously operate together;

where each given one of the separate link layers implements its own respective different separate advertiser within the BLE controller to cause transmission of an advertising packet according to the unique advertisement policy of the given link layer that is different from the advertisement policy used to transmit an advertising packet according to the different unique advertisement policy of each of the other separate link layers;

where each of the different advertisement policies of the respective separate simultaneously-operating link layers includes one or more advertisement configuration parameters that control transmission and/or reception operation of the radio, and that are different from one or more advertisement configuration parameters of the other different advertisement policies of each of the other simultaneously-operating link layers.

2. The method of claim 1, where the multiple different respective BLE advertisement packets comprise different first and second BLE advertisement packets transmitted with respective different first and second advertisement policies; and where the method further comprises:

arbitrating access by each of the separate link layers by scheduling transmission of the first and second BLE advertisement packets corresponding to the respective different first and second advertisement policies one at a time from the apparatus;

then transmitting the first BLE advertisement packet as scheduled using a first BLE link layer of the apparatus according to the first advertisement policy, and transmitting the second BLE advertisement packet as scheduled using a second and different BLE link layer of the same apparatus according to the second and different advertisement policy;

where the first BLE advertisement policy includes one or more advertisement configuration parameters that are different from one or more advertisement configuration parameters of the second advertisement policy.

3. The method of claim 1, further comprising using three or more separate BLE link layers of the apparatus to cause transmission of three or more different BLE advertisement packets from the apparatus according to three or more different respective advertisement policies, where each of the different advertisement policies includes one or more advertisement configuration parameters that are different from one or more advertisement configuration parameters of the other advertisement policies.

4. The method of claim 1, where each of the different advertisement configuration parameters of the multiple different advertisement policies is information controlling BLE advertisement packet transmission by the radio; where the different advertisement configuration parameters specify at least one of an advertisement packet type to be transmitted by the radio or an advertisement mode to be used by the radio to transmit the advertisement packets, an advertisement interval to be employed between transmission of advertisement packets by the radio, advertisement data to be included by the radio in the transmitted advertisement packets, a transmit power to be used by the radio to transmit the advertisement packets, a receive sensitivity level to be used by the radio to receive packets, a device address to be used by the radio when transmitting the advertisement packets, and a device identity to be used by the radio when transmitting the advertisement packets; and where the method further comprises using the information of the advertisement configuration parameters to determine and control operation of the radio for packet transmission and/or reception in a manner as specified by the information of the advertisement configuration parameters.

5. The method of claim 1, where the apparatus is a Bluetooth Low Energy (BLE) enabled advertising device configured as a BLE beacon; where the advertisement configuration parameters of a first one of the advertisement policies is information controlling BLE advertisement packet transmission by a the radio to transmit a first non-connectable BLE advertisement packet containing beacon information at a first packet transmission power specified by the information of the advertisement configuration parameters of the first one of the advertisement policies; where the advertisement configuration parameters of a second one of the advertisement policies is information controlling BLE advertisement packet transmission by the radio to transmit a second connectable BLE advertisement packet at a second packet transmission power specified by the information of the advertisement configuration parameters of the second one of the advertisement policies that is less than the first transmission power; and where the method further comprises operating a first one of the separate BLE link layers implemented by the BLE controller of the apparatus and using the information of the advertisement configuration parameters of the first one of the advertisement policies to determine transmission power and cause transmission by the radio of the first non-connectable BLE advertisement packet from the apparatus at a determined higher first transmission power specified by the first advertisement policy while simultaneously operating a second one of the separate BLE link layers implemented by the same BLE controller of the apparatus and using the information of the advertisement configuration parameters of second one of the advertisement policies to determine transmission power and cause transmission by the radio of the second connectable BLE advertisement packet from the apparatus at a determined lower second transmission power specified by the second advertisement policy without disruption to scheduled BLE advertisement packet timing for transmission of the BLE advertisement packets by the BLE controller from the apparatus.

6. The method of claim 5, further comprising determining if the first advertisement policy has been enabled and determining if the second advertisement policy has been enabled; and scheduling transmission of the first and second BLE advertisement packets from the apparatus one at a time when both first and second advertisement policies are determined to be enabled at the same time.

7. The method of claim 5, further comprising receiving in the second BLE link layer a connection request from a scanning device in response to the transmitted second connectable BLE advertisement packet at the same time the separate first link layer continues to operate; and responding to the connection request while the first link layer continues to operate by using the second BLE link layer to establish a connection with the scanning device while continuing to use the first BLE link layer to cause transmission of the first non-connectable BLE advertisement packet from the apparatus at the first transmission power specified by the first advertisement policy.

8. The method of claim 1, where the apparatus comprises a host layer, and a radio transceiver; where each of the multiple simultaneously-operating separate BLE link layers are disposed between a host interface coupled to the host layer and a radio interface coupled to the radio transceiver; and where the method further comprises scheduling the multiple simultaneously operating separate BLE link layers of the apparatus to cause transmission of the multiple different respective BLE advertisement packets one at a time by the transceiver of the apparatus.

9. The method of claim 1, where each of the multiple different respective BLE advertisement packets comprises a different one of a connectable and scannable undirected advertising event (ADV_IND), a connectable directed advertising event (ADV_DIRECT_IND), a non-connectable or non-scannable undirected advertising event (ADV_NONCONN_IND), or a scannable undirected (non-connectable) advertising event (ADV_SCAN_IND).

10. The method of claim 1, further comprising operating a first one of the multiple separate BLE link layers of the BLE enabled apparatus to cause transmission of a connectable BLE advertisement packet while at the same time operating a second one of the multiple separate BLE link layers of the same BLE enabled apparatus to cause transmission of a non-connectable BLE advertisement packet; and responding to a connection request received from another device in the first one of the multiple separate BLE link layers by using the first BLE link layer to establish a connection with the other device while simultaneously operating and using the second one of the multiple separate BLE link layers to cause transmission of a non-connectable BLE advertisement packet from the apparatus.

11. The method of claim 1, further comprising simultaneously operating the multiple separate BLE link layers implemented by the common BLE controller of the apparatus, to independently respond to specific advertising, scan and connection enable commands individually addressed to each of the multiple separate BLE link layers and received through a host interface from an application layer and/or host layer of the apparatus.

12. A method, comprising:
simultaneously operating multiple separate Bluetooth Low Energy (BLE) link layers implemented by a common BLE controller of a BLE enabled apparatus to share a same radio interface of a same radio to cause transmission of multiple different respective BLE advertisement packets from the apparatus according to multiple different respective advertisement policies by arbitrating access of each of the separate link layers one at a time to the same radio interface while the multiple different separate link layers are simultaneously operating to allow each given one of the separate link layers to access the same radio interface separately from each of the other link layers to cause transmission of a BLE advertisement packet having an advertisement policy that is different from the advertisement policy of the BLE advertisement packets transmitted by each of the other separate link layers that are simultaneously operating together with the given link layer;
where each of the different advertisement policies includes one or more advertisement configuration parameters that are different from one or more advertisement configuration parameters of the other different advertisement policies.

13. The method of claim 1, where the step of arbitrating comprises coordinating access by the separate simultaneously-operating link layers one at time to the same radio interface using first-in first out (FIFO) or round robin scheduling.

14. The method of claim 1, where the step of arbitrating comprises coordinating access by the separate simultaneously-operating link layers one at time to the same radio interface using round robin scheduling.

15. The method of claim 2, where the step of transmitting comprises transmitting the first BLE advertisement packet with a first device address and a first device identity, and transmitting the second BLE advertisement with a second device address and a second device identity; where the first device address is different from the second device address, where the first device identity is different from the second device identity, or a combination thereof.

16. The method of claim 2, where the step of transmitting comprises transmitting the first BLE advertisement packet with a first a transmit power, and transmitting the second BLE advertisement with a second transmit power, where the first transmit power is different from the second transmit power.

17. A Bluetooth Low Energy (BLE) enabled apparatus, comprising at least one processor or programmable logic device (PLD) coupled to memory and configured to be coupled to an antenna, the processor or PLD being programmed to:
implement a common BLE controller to simultaneously operate multiple different separate BLE link layers within the common BLE controller of the apparatus to share a same radio interface of a same radio;
arbitrate access by each of the separate link layers one at a time to the same radio interface while the multiple different separate link layers are simultaneously operating to allow each of the separate link layers to access the radio interface separately from each of the other link layers and implement its own unique advertisement policy that is different from the respective advertisement policy of each of the other link layers to cause the apparatus to transmit multiple different respective BLE advertisement packets using different advertisement policies while the different separate link layers continue to simultaneously operate together;
where each given one of the separate link layers implements its own respective different separate advertiser within the BLE controller to cause transmission of an advertising packet according to the unique advertisement policy of the given link layer that is different from the advertisement policy used to transmit an advertising packet according to the different unique advertisement policy of each of the other separate link layers;
where each of the different advertisement policies of the respective separate simultaneously-operating link layers includes one or more advertisement configuration parameters controlling transmission and/or reception operation of the radio, and that are different from one or more advertisement configuration parameters of the other different advertisement policies of each of the other simultaneously-operating link layers.

18. The apparatus of claim 17, where the multiple different respective BLE advertisement packets comprise different first and second BLE advertisement packets transmitted with respective different first and second advertisement policies; and where the processor or PLD is further programmed to:
arbitrate access by each of the separate link layers by scheduling transmission of the first and second BLE advertisement packets corresponding to the respective different first and second advertisement policies one at a time from the apparatus;
then transmit the first BLE advertisement packet as schedule using a first BLE link layer of the apparatus according to the first advertisement policy, and transmit the second BLE advertisement packet as scheduled using a second and different BLE link layer of the same apparatus according to the second and different advertisement policy;
where the first advertisement policy includes one or more advertisement configuration parameters that are different from one or more advertisement configuration parameters of the second advertisement policy.

19. The apparatus of claim 17, where the processor or PLD is further programmed to use three or more separate BLE link layers of the apparatus to cause transmission of three or more different BLE advertisement packets from the apparatus according to three or more different respective advertisement policies, where each of the different advertisement policies includes one or more advertisement configuration parameters that are different from one or more advertisement configuration parameters of the other advertisement policies.

20. The apparatus of claim 17, each of the different advertisement configuration parameters of the multiple different advertisement policies controlling BLE advertisement packet transmission by the radio; where information of the different advertisement configuration parameters specifies at least one of an advertisement packet type to be transmitted by the radio or an advertisement mode to be used by the radio to transmit the advertisement packets, an advertisement interval to be employed between transmission of advertisement packets by the radio, advertisement data to be included by the radio in the transmitted advertisement packets, a transmit power to be used by the radio to transmit the advertisement packets, a receive sensitivity level to be used by the radio to receive packets, a device address to be used by the radio when transmitting the advertisement packets, and a device identity to be used by the radio when transmitting the advertisement packets.

21. The apparatus of claim 17, where the apparatus is a Bluetooth Low Energy (BLE) enabled advertising device configured as a BLE beacon; the advertisement configuration parameters of a first one of the advertisement policies controlling BLE advertisement packet transmission by the radio to transmit a first non-connectable BLE advertisement packet containing beacon information at a first packet transmission power specified by information of the advertisement configuration parameters of the first one of the advertisement policies; the advertisement configuration parameters of a second one of the advertisement policies controlling BLE advertisement packet transmission by the radio to transmit a second connectable BLE advertisement packet at a second packet transmission power specified by information of the advertisement configuration parameters of the second one of the advertisement policies that is less than the first transmission power; and where the processor or PLD is further programmed to operate a first one of the separate BLE link layers implemented by the BLE controller of the apparatus and use the information of the advertisement configuration parameters of the first one of the advertisement policies to determine transmission power and cause transmission of the first non-connectable BLE advertisement packet from the apparatus at a determined higher first transmission power specified by the first advertisement policy while simultaneously operating a second one of the separate BLE link layers implemented by the same BLE controller of the apparatus and using the information of the advertisement configuration parameters of the second one of the advertisement policies to determine transmission power and cause transmission of the second connectable BLE advertisement packet from the apparatus at a determined lower second transmission power specified by the second advertisement policy without disruption to scheduled BLE advertisement packet timing for transmission of the BLE advertisement packets by the BLE controller from the apparatus.

22. The apparatus of claim 21, where the processor or PLD is further programmed to determine if the first advertisement policy has been enabled and to determine if the second advertisement policy has been enabled; and to schedule transmission of the first and second BLE advertisement packets from the apparatus one at a time when both first and second advertisement policies are determined to be enabled at the same time.

23. The apparatus of claim 21, where the processor or PLD is further programmed to receive in the second BLE link layer a connection request from a scanning device in response to the transmitted second connectable BLE advertisement packet at the same time the separate first BLE link layer continues to operate; and to respond to the connection request while the first link layer continues to operate by using the second BLE link layer to establish a connection with the scanning device while continuing to use the first BLE link layer to cause transmission of the first non-connectable BLE advertisement packet from the apparatus at the first transmission power specified by the first advertisement policy.

24. The apparatus of claim 17, further comprises a host layer and a radio transceiver; where the processor or PLD is further programmed to simultaneously implement each of the multiple separate BLE link layers between a host interface coupled to the host layer and a radio interface coupled to the radio transceiver; and to arbitrate access by each of the separate link layers one at a time by scheduling the multiple separate BLE link layers of the apparatus to cause transmission of the multiple different respective BLE advertisement packets one at a time by the transceiver of the apparatus.

25. The apparatus of claim 17, where each of the multiple different respective BLE advertisement packets comprises a different one of a connectable and scannable undirected advertising event (ADV_IND), a connectable directed advertising event (ADV_DIRECT_IND), a non-connectable or non-scannable undirected advertising event (ADV_NON-CONN_IND), or a scannable undirected (non-connectable) advertising event (ADV_SCAN_IND).

26. The apparatus of claim 17, where the processor or PLD is further programmed to: use a first one of the multiple separate BLE link layers to cause transmission of a connectable BLE advertisement packet while at the same time using a second one of the multiple separate BLE link layers to cause transmission of a non-connectable BLE advertisement packet, and to respond to a connection request received from another device in the first one of the multiple separate BLE link layers by using the first BLE link layer to establish a connection with the other device while simultaneously operating and using the second one of the multiple separate BLE link layers to cause transmission of a non-connectable BLE advertisement packet from the apparatus.

27. The apparatus of claim 17, where the where the processor or PLD is further programmed to simultaneously operate the multiple separate BLE link layers implemented by the common BLE controller of the apparatus to independently respond to specific advertising, scan and connection enable commands individually addressed to each of the multiple separate BLE link layers and received through a host interface from an application layer and/or host layer of the apparatus.

* * * * *